US010756838B2

(12) United States Patent
Jiang et al.

(10) Patent No.: US 10,756,838 B2
(45) Date of Patent: Aug. 25, 2020

(54) METHODS AND APPARATUSES FOR NUMEROLOGY MULTIPLEXING (71) Applicant: NEC CORPORATION, Tokyo (JP)

(72) Inventors: Lei Jiang, Beijing (CN); Hongmei Liu, Beijing (CN); Gang Wang, Beijing (CN)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/757,466

(22) PCT Filed: Aug. 2, 2016

(86) PCT No.: PCT/CN2016/092809
§ 371 (c)(1),
(2) Date: Mar. 5, 2018

(87) PCT Pub. No.: WO2018/023364
PCT Pub. Date: Feb. 8, 2018

(65) Prior Publication Data
US 2019/0149257 A1 May 16, 2019

(51) Int. Cl.
*H04W 4/00* (2018.01)
*H04J 13/00* (2011.01)
(Continued)

(52) U.S. Cl.
CPC ........ *H04J 13/0003* (2013.01); *H04L 5/0094* (2013.01); *H04L 27/2602* (2013.01)

(58) Field of Classification Search
CPC ........ H04J 13/003; H04J 11/00; H04W 72/04; H04W 72/12
See application file for complete search history.

(56) References Cited

U.S. PATENT DOCUMENTS

2015/0256308 A1  9/2015 Ma et al.
2015/0349987 A1  12/2015 Soriaga et al.
(Continued)

FOREIGN PATENT DOCUMENTS

CN  101404539 A  4/2009
CN  101854727 A  10/2010
(Continued)

OTHER PUBLICATIONS

Communication dated Jan. 4, 2019 from the State Intellectual Property Office of the P.R.C. in counterpart Application No. 201680055211.2.
(Continued)

*Primary Examiner* — Abdelnabi O Musa
(74) *Attorney, Agent, or Firm* — Sughrue Mion, PLLC (57) ABSTRACT Embodiments of the present disclosure relate to methods and apparatuses of numerology multiplexing at a serving node and a terminal device in a wireless communication system. The method of numerology multiplexing comprises transmitting information about at least two numerologies in common downlink transmission resource, and multiplexing the at least two numerologies in a same frequency band based on the information about the at least two numerologies. With embodiments of the present disclosure, it is possible to enable the different numerologies to be multiplexed in the same band.

22 Claims, 5 Drawing Sheets (51) Int. Cl.
H04L 27/26 (2006.01)
H04L 5/00 (2006.01)

(56) References Cited

U.S. PATENT DOCUMENTS

| | | | |
|---|---|---|---|
| 2015/0358971 A1 | 12/2015 | Soriaga et al. | |
| 2016/0294498 A1* | 10/2016 | Ma | H04L 27/2647 |
| 2016/0352551 A1* | 12/2016 | Zhang | H04L 27/2602 |
| 2017/0181149 A1* | 6/2017 | Ang | H04L 5/003 |
| 2017/0311276 A1* | 10/2017 | Tsai | H04B 7/0617 |
| 2017/0325250 A1* | 11/2017 | Manolakos | H04L 27/2602 |

FOREIGN PATENT DOCUMENTS

| | | |
|---|---|---|
| CN | 103262638 A | 8/2013 |
| CN | 103931126 A | 7/2014 |
| EP | 3320638 A1 | 5/2018 |
| EP | 3400742 A1 | 11/2018 |
| WO | 2016/040290 A1 | 3/2016 |
| WO | 2016/064534 A1 | 4/2016 |
| WO | 2017/122752 A1 | 7/2017 |

OTHER PUBLICATIONS

International Search Report for PCT/CN2016/092809 dated Mar. 29, 2017 [PCT/ISA/210].
Communication dated Sep. 12, 2019, from the State Intellectual Property Office of People's Republic of China in counterpart Application No. 201680055211.2.
Communication dated Apr. 23, 2019 from the Japanese Patent Office in counterpart application No. 2018-523460.
Communication dated Apr. 16, 2019 from the European Patent Office in application No. 16910962.6.
Panasonic, "Discussion on the multiplexing of different numerologies", 3GPP TSG-RAN WG1 Meeting 85, May 23-27, 2016, R1-164985, pp. 1-5, XP051096781.
NEC, "Discussion on numerology multiplexing", 3GPP TSG RAN WG1 Meeting #86, Aug. 22-26, 2016, R1-166637, 2 pages, XP051125482.

* cited by examiner

METHODS AND APPARATUSES FOR NUMEROLOGY MULTIPLEXING

CROSS REFERENCE TO RELATED APPLICATIONS

This application is a National Stage of International Application No. PCT/CN2016/092809, filed on Aug. 2, 2016.

FIELD OF THE INVENTION

The non-limiting and exemplary embodiments of the present disclosure generally relate to the field of wireless communication techniques, and more particularly relate to methods and apparatuses for numerology multiplexing.

BACKGROUND OF THE INVENTION

Orthogonal Frequency-Division Multiplexing (OFDM) is a method of encoding digital data on multiple carrier frequencies and it is a frequency-division multiplexing (FDM) scheme used as a digital multi-carrier modulation method. According to the OFDM, a large number of closely spaced orthogonal subcarrier signals are used to carry datan several parallel data streams or channels. Typically, design parameters for an OFDM system are derived according to system requirements. Parameters to be considered include, for example, subcarrier spacing, guard time/cyclic prefix and symbol duration, transmission time interval (TTI), etc.

Recently, diverse requirements are constantly demanding, and for different deployment scenarios and different carrier frequencies, it may require different numerologies. Thus, different numerologies are required in new radio (NR).

In a technical document "Mixed numerology in an OFDM system", Ericsson, 3GPP RAN1#85, 2016, May, there is proposed a mixed numerology in an OFDM system wherein it is proposed to introduce guard band between multiplexed numerologies to reduce inter-numerology interference. However, in this document, it only focus on the inter-numerology interference and does not give any idea about how to multiplex numerologies.

Thus, in existing solutions, there is no a solution about how to support different numerologies in the same band yet and therefore there is a need to enable numerology multiplexing to support multiplexing of different services with diverse requirements in the same frequency band.

SUMMARY OF THE INVENTION

In the present disclosure, there is provided a new solution for numerology multiplexing in a wireless communication system, to mitigate or at least alleviate at least part of the issues in the prior art.

According to a first aspect of the present disclosure, there is provided a method of numerology multiplexing in a wireless communication system. This method could be performed at a serving node, for example a BS, like a node B (NodeB or NB). The method comprises transmitting information about at least two numerologies in common downlink transmission resource; and multiplexing the at least two numerologies in a same frequency band based on the information about the at least two numerologies.

According to a second aspect of the present disclosure, there is provided a method of numerology multiplexing in a wireless communication system. This method can be performed at a terminal device, for example UE, or other like terminal devices. The method comprises receiving information about at least two numerologies in common downlink transmission resource; and multiplexing the at least two numerologies in a same frequency band based on the information about the at least two numerologies.

According to a third aspect of the present disclosure, there is provided an apparatus for numerology multiplexing in a wireless communication system. This apparatus could be implemented at a serving node, for example a BS, like a node B (NodeB or NB). The apparatus comprises an information transmission module and a numerology multiplexing module. The information transmission module is configured to transmit information about at least two numerologies in common downlink transmission resource. The numerology multiplexing module is configured to multiplex the at least two numerologies in a same frequency band based on the information about the at least two numerologies.

According to a fourth aspect of the present disclosure, there is provided an apparatus of numerology multiplexing in a wireless communication system. This apparatus could be implemented at a terminal device, for example UE, or other like terminal devices. The apparatus comprises an information receiving module and a numerology multiplexing module. The information receiving module is configured to receive information about at least two numerologies in common downlink transmission resource. The numerology multiplexing module is configured to multiplex the at least two numerologies in a same frequency band based on the information about the at least two numerologies.

According to a fifth aspect of the present disclosure, there is provided a computer-readable storage media with computer program code embodied thereon, the computer program code configured to, when executed, cause an apparatus to perform actions in the method according to any embodiment in the first aspect.

According to a sixth aspect of the present disclosure, there is provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it provides a new solution for numerology multiplexing in a wireless communication system, in which information about at least two numerologies is transmitted in common downlink transmission resource and the at least two numerologies are multiplexed based on the information about at least two numerologies. In such a way, it is possible to enable different numerologies to be multiplexed in the same band and thus support the numerology multiplexing in new radio system like 5G.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

As mentioned hereinabove, in the existing solutions, there is no a solution about how to support different numerologies in the same band yet. Thus, in the present disclosure, there is provided a new solution of numerology multiplexing to support different numerologies in the same band. In the present disclosure, it is proposed to transmit information about different numerologies to terminal devices by using common downlink transmission resource, like Physical Broadcast Channel (PBCH), Primary Synchronization Signal (PSS), Secondary Synchronization Signal (SSS), etc. Thus, the information about different numerologies can be notified to terminal devices from the serving node and the numerologies can be multiplexed on the same band based on the information. Hereinafter, the solution of numerology multiplexing will be described in details with reference to the accompany drawings as provided therein.

Figure 1:
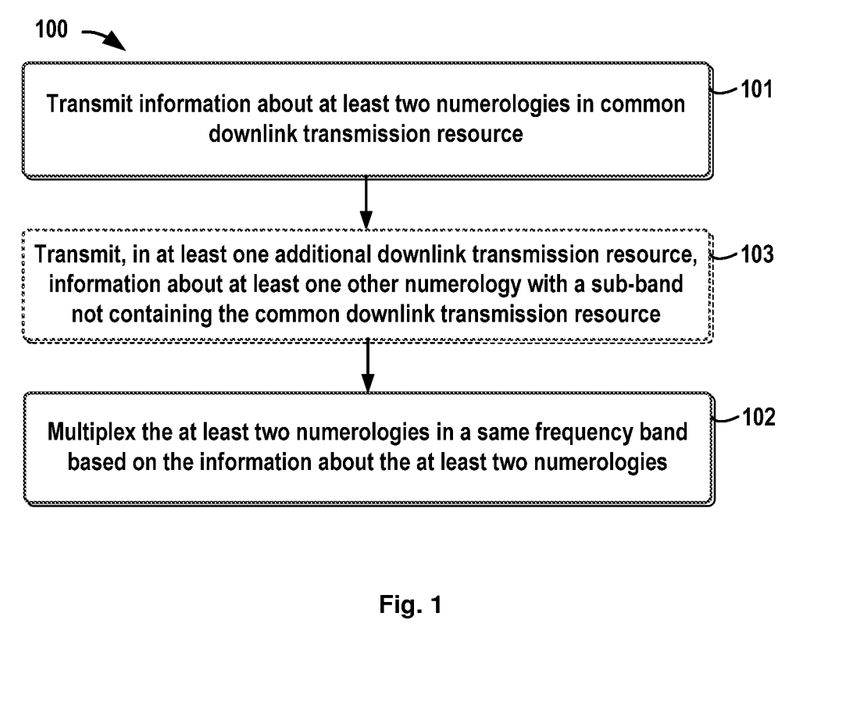
FIG. 1 schematically illustrates a flow chart of a method of numerology multiplexing at a serving node in a wireless communication system according to an embodiment of the present disclosure.

Reference is first made to FIG. 1, which schematically illustrates a flow chart of a method 100 of numerology multiplexing in a wireless communication system according to an embodiment of the present disclosure. The method 100 can be performed at a serving node, for example a BS, like a node B (NodeB or NB).

As illustrated in FIG. 1, first in step S101, information about at least two numerologies is transmitted in common downlink transmission resource. Herein, the common downlink transmission resource is resource which can be used to notify all terminal devices of the information about the numerologies, and it can be for example PBCH, PSS, SSS, or the like etc. In the common downlink transmission resource is contained information about at least two numerologies. For a numerology, the related information at least requires to include, for example, subcarrier spacing information, and/or sub-band bandwidth information. Herein, the information about at least two numerologies can include the information for different numerologies, which can include, for example, at least one of the number of numerologies to be multiplexed, numerology multiplexing configuration information, subcarrier spacing information for at least one of the numerologies; sub-band bandwidth information for at least one of the numerologies; position information about additional downlink transmission resource for at least one of the numerologies; or any other information. In different cases, the information about the at least two numerologies will be different and several examples will be described with reference to FIGS. 3 to 9.

Hereinafter, only for illustration purposes, the PBCH will be described as the example of the downlink transmission resource for numerology information; however, the skilled in the art shall be noticed that the present disclosure is not limited to these specific examples and it can be applied to any other suitable downlink common transmission resource, like PSS, SSS, etc. as well.

Figure 2:
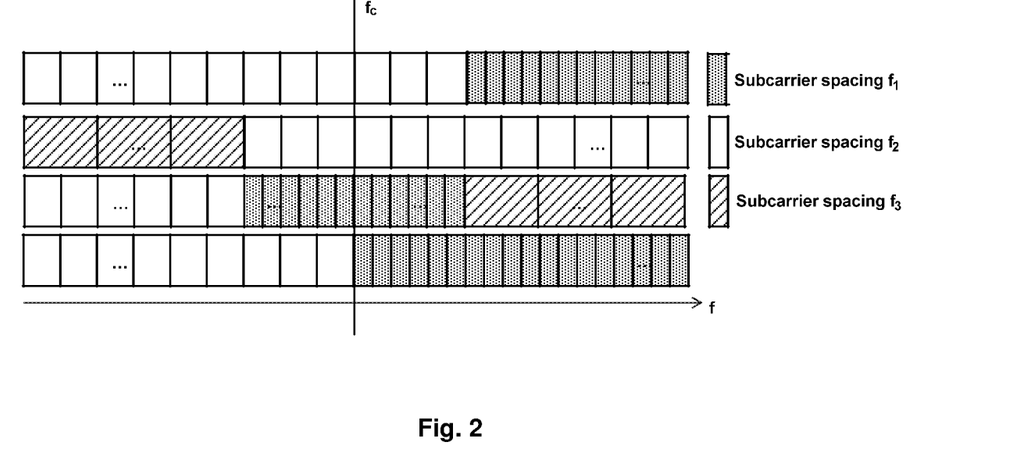
FIG. 2 schematically illustrates a diagram of different numerology multiplexing patterns according to an embodiment of the present disclosure.

For illustrative purposes, FIG. 2 illustrates a diagram of different numerology multiplexing patterns according to an embodiment of the present disclosure. As illustrated in FIG. 2, the numerologies can be multiplexed with one of frequency spacings for the numerologies on the center frequency $f_c$ of the system bandwidth. In the top pattern illustrated in FIG. 2, two numerologies with subcarrier spacing $f_1$ and subcarriers spacing $f_2$ are multiplexed on the same band; the subcarrier $f_2$ is on the central frequency $f_c$, or in other words, the central frequency $f_c$ is within the sub-band for the numerology with subcarrier spacing $f_2$. In the second pattern from the top as illustrated in FIG. 2, two numerologies with the subcarrier spacing $f_2$ and subcarriers spacing $f_3$ are multiplexed on the same band; the subcarrier $f_2$ is on the central frequency $f_c$. In the third pattern from the top as illustrated in FIG. 2, three numerologies with the subcarrier spacing $f_1$, the subcarrier spacing $f_2$ and the subcarriers spacing $f_3$ are multiplexed on the same band; the subcarrier $f_1$ is on the central frequency $f_c$. In the bottom pattern as illustrated in FIG. 2, two numerologies with the subcarrier spacing $f_1$ and subcarriers spacing $f_2$ are multiplexed on the same band; both the subcarrier $f_1$ and the subcarriers spacing $f_2$ are on the central frequency $f_c$, in other word, the central frequency $f_c$ is the common boundary of sub-bands for the numerologies with subcarrier spacing $f_1$ and subcarrier spacing $f_2$. Therefore, it can be seen that the sub-band for the numerology with subcarrier spacing on the central frequency $f_c$ can be evenly or non-evenly spread around $f_c$. In addition, the subcarrier spacing on the central frequency $f_c$ could be the smallest one of frequency spacings for the at least two numerologies, as illustrated in the third pattern from the top. Or alternatively, this subcarrier spacing can also be a subcarrier spacing designed for the band. Other numerologies can be scheduled in sub-bands adjacent to the sub-band with the subcarrier spacing on the central frequency $f_c$.

In FIG. 2, there are illustrated different numerology multiplexing patterns, but these patterns are just given for illustrative purpose and the present disclosure is not limited thereto. The skilled in the art could conceive other different patterns, for example those with more or less numerologies. In addition, the numerologies can also be multiplexed with one of fixed patterns which are predefined for example in 5G specification. In other word, different numerologies can be multiplexed based on a predetermined pattern.

Figure 3:
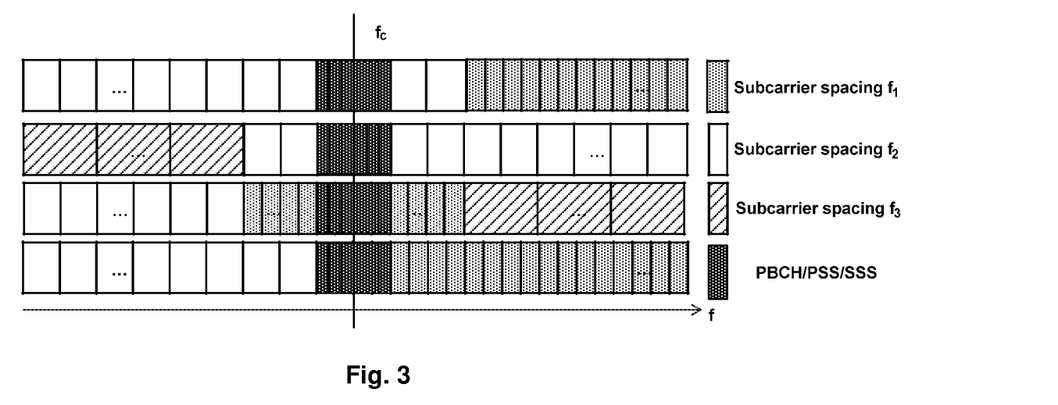
FIG. 3 schematically illustrates diagrams of example positions of common downlink transmission resource for carrying information about numerologies according to an embodiment of the present disclosure.

In numerology multiplexing, the common downlink transmission resource for the numerologies, like PBCH/PSS/SSS, can be located at the center of the whole system bandwidth. FIG. 3 illustrates diagrams of example positions of common downlink transmission resource and one or more additional downlink transmission resource for carrying information about numerologies according to an embodiment of the present disclosure. In FIG. 3, for different numerology multiplexing patterns, the PBCH/PSS/SSS is located at the center of the system bandwidth. The resources for the common PBCH/PSS/SSS may include n physical resource blocks (PRBs) and has a fixed subcarrier spacing. The fixed subcarrier spacing may include, for example, 15 KHz, similar to that in the legacy system and the number n may be set as 6 or any other value which is depended on the requirements. However, it shall be appreciated that the required resource for PBCH/PSS/SSS depends on the definition of PRB and numerology, and the subcarrier spacing can also be another predetermined value.

Next, it is assumed that 6 PRBs are scheduled for the PBCH/PSS/SSS. In such a case, if a PRB is defined as 12 subcarriers, then the PBCH may still needs 4 symbols, and can be transmitted in the second slot if there are two slots in a TTI. On the other hand, if a PRB is defined as a 180 KHz frequency resource block, the PBCH may need more symbols depending on the numerology. The number of symbols scales with the ratio of the current subcarrier spacing and the predetermined subcarrier spacing 15 KHz. For example, for a numerology with subcarrier spacing f=30 KHz, the required number of symbols for the PBCH is 4*(30/15)=8. The required symbols for PSS/SSS can be determined similarly as for the PBCH, the baseline is the required symbol for a numerology with a subcarrier spacing $f_0$=15 KHz as in LTE.

As illustrated in FIG. 3, there is a common PBCH/PSS/SSS in the whole band, which carries all information required for different numerologies. In a case of the PBCH, it can include legacy information such as Master Information Block (MIB), cell-specific antenna port, etc. In addition, it could also include the information on the at least two numerologies, which may include for example, a number of multiplexed numerologies, numerology multiplexing configuration information, subcarrier spacing information for the numerologies; sub-band bandwidth information for the numerologies.

The number of multiplexed numerologies can indicate the number of numerologies to be multiplexed on the same band, and it can be indicated explicitly or implicitly through other information like subcarrier spacing for the numerologies; sub-band bandwidth information for the numerologies, which will be described in details hereinafter.

The numerology multiplexing configuration information can include a configuration index to indicate a particular configuration or pattern for the numerology multiplexing. For example, there can be a predetermined table showing indexes and corresponding numerology multiplexing patterns. A numerology multiplexing pattern may indicate a number of numerologies to be multiplexed, the subcarrier spacing for each numerology, and the sub-band bandwidth for each numerology. Thus, by means of a configuration index, it is possible to indicate the numerology multiplex pattern to be used. However, this information is not necessary but can be omitted when the numerology multiplexing pattern is a fixed one for a specific number of numerologies.

The subcarrier spacing information for the numerologies indicates subcarrier spacings for respective numerologies. In order to indicate subcarrier spacing information for each numerology, it can use for example a bitmap. For example, if candidate subcarrier spacings include {15 KHz, 30 KHz, 60 KHz}, the set of subcarrier spacings can be mapped to {00, 01, 10}. The number of required bits for each subcarrier spacing depends on the number of candidate subcarrier spacing. If the number of candidate subcarrier spacing is 3, then 2 bits are need to indicated a subcarrier spacing, if the number is 5, then 3 bits are enough The required bits for the bitmap depend on the number of required bits for each subcarrier spacing and the number of multiplexed numerologies. In the above case, if the set of subcarrier spacings can be mapped to {00, 01, 10} and there are two numerologies to be multiplexed, then four bits are enough for the bitmap. For example, the bitmap "0010" may indicate that the first numerology is 15 KHz and the second numerology is 60 KHz.

In addition, if the number of multiplexed numerologies is not contained in the information about the numerologies and thus is unknown, then the bitmap size and valid bits in the bitmap can be used to indicate the number of the numerologies to be multiplexed. For example, the bitmap size can be determined by the maximum number of possible multiplexed numerologies. In such a case, the subcarrier spacing of the multiplexed numerology will be indicated as above but invalid bits for the numerologies that are not multiplexed can be filed in the bitmap. Taking the above-mentioned case as an example, the candidate subcarrier spacing can be {15 KHz, 30 KHz, 60 KHz}, the maximum number of possible multiplexed numerology is 3, and the actual number of multiplexed numerology is 2. In such a case, the bitmap could be "001011", wherein "00" and "10" indicate 15 KHz for the first numerology and 60 KHz for the second numerology and "11" are invalid bits for filling the bitmap. Thus, the terminal device can only detect "00" and "10" and it can readily learn that the number of numerologies to be multiplexed is 2. As another example, if the candidate subcarrier spacing are {15 KHz, 30 KHz, 60 KHz, 120 KHz}, then we can map the set to {000, 001, 010, 011}, and we can use invalid bits like 111 or any other unused bits to fill the bitmap.

The sub-band bandwidth information for the numerologies indicates sub-band bandwidths for respective numerologies. In an embodiment of the present disclosure, the sub-band bandwidth information indicates a bandwidth for the sub-band of each numerology. The sub-band of each numerology follows the same order as the subcarrier spacing information. That is to say, the first sub-band bandwidth corresponds to the first subcarrier spacing, the second bandwidth corresponds to the second subcarrier spacing, and so on. There may be a set of candidate bandwidths, and similarly a bitmap can be used for bandwidth indication. As an example, the set of candidate bandwidths may include {5 M, 10 M, 15 M}, this set can be mapped to {00, 01, 10}. If there are two numerologies for multiplexing, then a bitmap "0010" may indicate the first sub-band bandwidth is 5 M and the second sub-band bandwidth is 15 M, the bitmap "0101" indicates that both the first and the second sub-band bandwidths are 10 M. Similarly to the bitmap for the subcarrier spacing information, the maximum size of the bitmap for the sub-band bandwidth information can be determined by the number of candidate bandwidth and the number of numerologies to be multiplexed as well.

In addition, if the number of multiplexed numerologies is not contained in the information about the numerologies and thus is unknown, then the sub-band bandwidth information can also be used to implicitly indicate the number of the numerologies to be multiplexed in a similar way. For illustration purposes, Table 1 illustrates an example mapping between sub-band bandwidths and mapped bits.

TABLE 1 example mapping between bandwidths and mapped bits

| | bandwidth | | | |
|---|---|---|---|---|
| | 5M | 10M | 15M | Invalid bits |
| Mapped bits | 00 | 01 | 10 | 11 |

In such a case, for a bitmp "001011", it can be used to indicate that the first sub-band has a width of 5 M, the second sub-band has a width of 15 M and there is two numerologies to be multiplexed since there is contained only two valid bits In another embodiment of the present disclosure, the sub-band bandwidth information may include the start and end of the bandwidth. Thus, a bandwidth can be indicated by a start position of a sub-band and an end position of the sub-band. The start of the first sub-band and the end of the last sub-band may be ignored if they correspond to the start and end of the system band. In a case that there is no guard band introduced between numerologies or the guard band between numerologies is fixed, only the end position of the last sub-band or the start position of the current sub-band is enough to distinguish the sub-band. Otherwise, both the end position of last sub-band and the start position of current sub-band should be indicated.

The start position and end position of the sub-band can be at PRB level. If the PRB is defined as the same size for each numerology, e.g., 180 KHz resource block, then the system will have a constant number of PRBs. Thus, it is easy to indicate the start position and end position with the PRB number. For different numerologies, the PRB will have different number subcarriers. For example, for 15 KHz, a PRB has 12 subcarriers; for 60 KHz, a PRB has 3 subcarriers. If the PRB is defined as a 12-subcarrier resource block, then the number of PRBs in the system will change according to the multiplexed numerology and its bandwidth. Considering the PBCH resources with a 15 KHz subcarrier spacing, it will be complicated for the UE to estimate the number of PRBs. In another embodiment of the present disclosure, it is possible to set the start position and the end position at a plurality of potential positions on the system bandwidth. That is to say, the start and end of a sub-band can only be selected from a set of predetermined positions. Thus, it may reduce the complexity and required resource for indicating the sub-band bandwidth information The information about the numerologies can be transmitted in the MIB using spare 10 bits with or without additional information bits. Alternatively, all the numerology related information can also be transmitted with new information bits.

Reference is made back to FIG. 1, at step 102, it may multiplex the at least two numerologies in the same frequency band based on the information about the numerologies.

Figure 4:
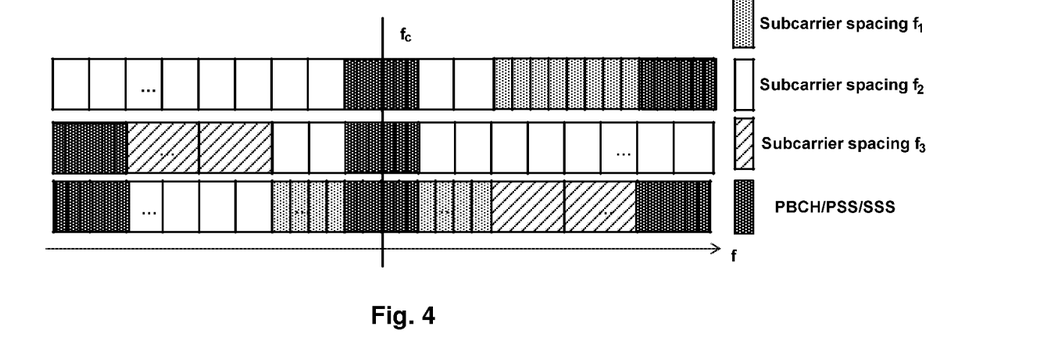
FIG. 4 schematically illustrates diagrams of example positions of common downlink transmission resource and additional downlink transmission resource for carrying information about numerologies according to another embodiment of the present disclosure.

Besides, in FIG. 3, there is only one common downlink transmission resource; however, in another embodiment of the present disclosure, it is also possible to additionally or optionally include one or more additional downlink transmission resource. Thus in FIG. 1, it is possible to transmit, in at least one additional downlink transmission resource, information about at least one other numerology with a sub-band not containing the common downlink transmission resource That is to say, in addition to the common downlink transmission resource, additional downlink transmission resources can be used. FIG. 4 schematically illustrates diagrams of example positions of common downlink transmission resource and additional downlink transmission resource for carrying information about numerologies according to another embodiment of the present disclosure. As illustrated in FIG. 4, for different numerology multiplexing patterns, there is one common PBCH/PSS/SSS located at the center of the system bandwidth and in addition to this, for other sub-bands not containing the common downlink transmission resource, there is an additional downlink transmission resource like PBCH/PSS/SSS for each of the other sub-bands, which can also be called as sub-band specific transmission resource. In the illustrated embodiments, each of the common PBCH/PSS/SSS and the one or more additional PBCH/PSS/SSS has a fixed subcarrier spacing $f_0$ (e.g. 15 KHz) and each the one or more additional PBCH/PSS/SSS is located at a border of the system bandwidth.

The common PBCH/PSS/SSS located at the center of the system bandwidth is a common resource that will be detected by all terminal devices. Taking the PBCH as an example, the common PBCH can include legacy information such as MIB, cell-specific antenna port, etc. In addition, the PBCH could also include the information on the numerologies to be multiplexed, which may include for example, a number of multiplexed numerologies, subcarrier spacing information on a sub-band in wherein the common PBCH is located and sub-band bandwidth information on the sub-band (like the sub-band bandwidth, or the start and end position of the sub-band). In view of the fact, the one or more additional PBCHs are located at borders of the system bandwidth, it is possible not to include position information about the one or more additional PBCHs, since the system bandwidth is known and the border can be readily known by the terminal devices. Thus in such a case, the maximum number of numerologies is limited to 3. If there are more than three numerologies, and for additional PBCH/PSS/SSS not located at the borders of the system bandwidth, for example those located at a border of sub-band, their position information can be included in the common PBCH. On the other hand, for the one or more additional PBCH, the information contained therein may include the subcarrier spacing information for their respective sub-bands, and sub-band bandwidth information for their respective sub-bands (like the sub-band bandwidth, or the start and end position of the sub-band).

Thus, in this case, all PBCHs use a fixed subcarrier spacing $f_0$ (e.g., like 15 KHz) and additional PBCHs are located at borders of the system bandwidth. Therefore, the terminal devices can directly detect the common PBCH at the center of the system bandwidth and then detect additional sub-band specific PBCHs at the borders of the system bandwidth. Thus, compared with the legacy PBCH, the additional PBCH further includes the subcarrier spacing, sub-band bandwidth or the start and end position of the sub-band of the corresponding numerology. Herein, the system bandwidth may not be necessary anymore.

Figure 5:
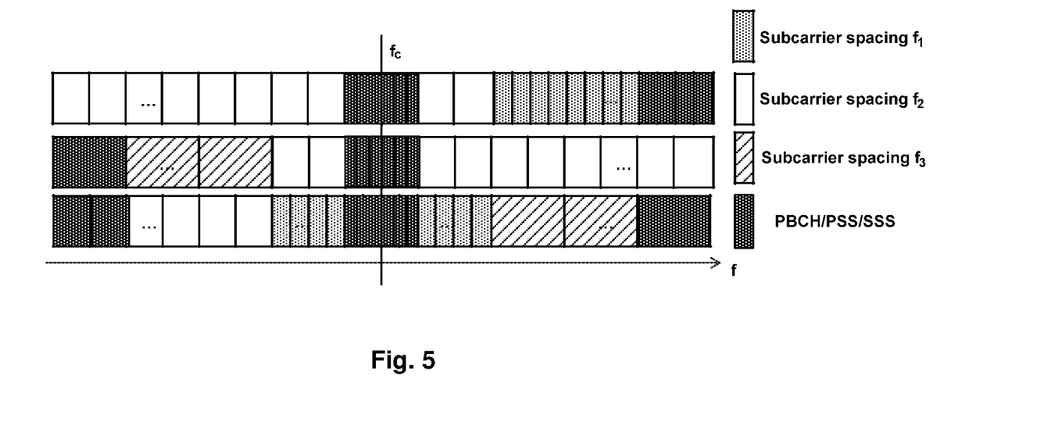
FIG. 5 schematically illustrates diagrams of example positions of common downlink transmission resource and additional downlink transmission resource for carrying information about numerologies according to a further embodiment of the present disclosure.

In FIG. 4, all of the common PBCH/PSS/SSS and the one or more additional PBCH/PSS/SSS use a fixed subcarrier spacing $f_0$ like 15 KHz, but the present disclosure is not limited thereto. FIG. 5 schematically illustrates diagrams of example positions of common downlink transmission resource and additional downlink transmission resource for carrying information about numerologies according to a further embodiment of the present disclosure. In FIG. 5, the common PBCH/PSS/SSS located at the center of the system bandwidth has a fixed subcarrier spacing $f_0$ but each of additional PBCH/PSS/SSS located at the border of the system bandwidth has a sub-band specific subcarrier spacing. In other words, the common PBCH/PSS/SSS may be transmitted by using a fixed subcarrier spacing (e.g. 15 KHz) while the additional PBCH/PSS/SSS which are sub-band specific transmission resource can use the subcarrier spacing of the corresponding sub-band. In such a case, in addition to the information contained in the common PBCH as in FIG. 4, it shall further include the subcarrier spacing information for the other sub-bands in the common PBCH and the addition PBCH does not need to include this information any more.

Thus, in such case, the terminal device first detect the common PBCH at the center of the system bandwidth and then detect additional sub-band specific PBCHs at the borders of the system bandwidth according to the subcarrier spacing for respective sub-bands as indicated in the common PBCH. Thus, compared with the legacy PBCH, the additional PBCH could further include the sub-band bandwidth or the start and end position of the sub-band of the corresponding numerology. At the same time, the system bandwidth may not be necessary anymore.

Similarly, for the cases as illustrated in FIGS. 4 and 5, the information about the numerologies can be transmitted in the MIB using the spare 10 bits with or without additional information bits. Alternatively, all the numerology related information can also be transmitted with new information bits as well. In addition, it shall be appreciated that in FIGS. 4 and 5, the indication about information such as the subcarrier spacing information, the sub-band bandwidth, etc. and other related aspect can be similar to those in FIG. 3 and thus will be not elaborated herein.

Figure 6:
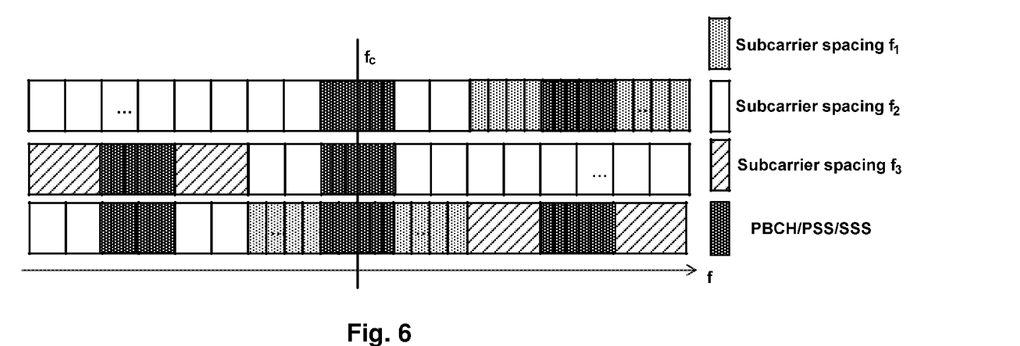
FIG. 6 schematically illustrates diagrams of example positions of common downlink transmission resource and additional downlink transmission resource for carrying information about numerologies according to a still further embodiment of the present disclosure.

FIG. 6 schematically illustrates diagrams of example positions of common downlink transmission resource and additional downlink transmission resource for carrying information about numerologies according to a still further embodiment of the present disclosure. In FIG. 6, the common PBCH/PSS/SSS and the additional PBCH/PSS/SSS both have a fixed subcarrier spacing (e.g. 15 KHz). Different from the case illustrated in FIG. 4, the additional PBCH/PSS/SSS as illustrated in FIG. 6 is not located at the border of the system bandwidth but located at a center of a corresponding sub-band. In such a case, in addition to the mentioned legacy information and the mentioned information on the numerologies (such as the number of the numerologies to be multiplexed, the subcarrier spacing information on a sub-band in wherein the common PBCH/PSS/SSS is located and sub-band bandwidth information on the sub-band) as in FIG. 4, the information on the numerologies to be multiplexed contained in the common PBCH may further include position information on respective additional downlink transmission resources.

Thus, the terminal devices first detect the common PBCH at the center of the system bandwidth and then detect additional sub-band specific PBCHs at the center of a respective sub-band according to position information on respective additional downlink transmission resource indicated in the common PBCH. Thus, compared with the legacy PBCH, the additional PBCH further includes the subcarrier spacing, the sub-band bandwidth or the start and end position of the sub-band of the corresponding numerology. At the same time, the system bandwidth may not be necessary anymore.

Figure 7:
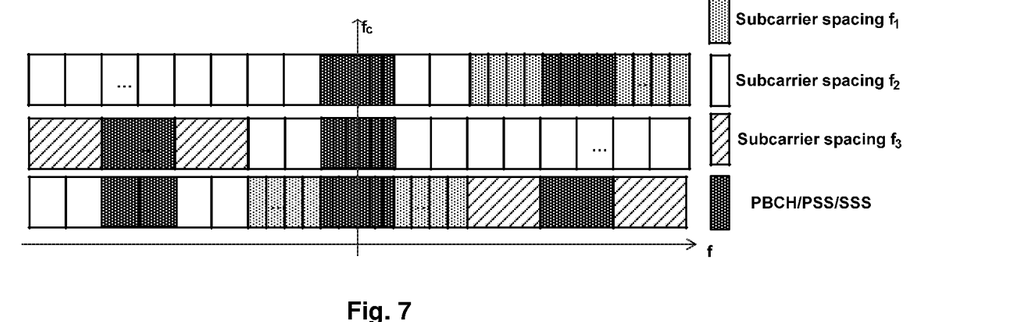
FIG. 7 schematically illustrates diagrams of example positions of common downlink transmission resource and additional downlink transmission resource for carrying information about numerologies according to a yet further embodiment of the present disclosure.

FIG. 7 further schematically illustrates diagrams of example positions of common downlink transmission resource and additional downlink transmission resource for carrying information about numerologies according to a yet further embodiment of the present disclosure. The difference between the case in FIG. 7 and the case in FIG. 6 lies in that the additional PBCH uses sub-band specific subcarrier spacing. In other words, the common PBCH/PSS/SSS may be transmitted by using a fixed subcarrier spacing (e.g. 15 KHz) while the additional PBCH/PSS/SSS which is sub-band specific transmission resource can use the subcarrier spacing of the corresponding sub-band. In such a case, in addition to the information contained in the common PBCH in FIG. 6, it shall further include the subcarrier spacing information for the other sub-bands in the common PBCH. On the other hand, compared with the legacy PBCH, the additional PBCH may further include the sub-band bandwidth or the start and end position of the sub-band of the corresponding numerology. At the same time, the system bandwidth may not be necessary anymore.

Similarly, for the cases as illustrated in FIGS. 6 and 7, the information about the numerologies can be transmitted in the MIB using the spare 10 bits with or without additional information bits. Alternatively, all the numerology related information can also be transmitted with new information bits. In addition, it shall be appreciated that in FIGS. 6 and 7, the indication about information such as the subcarrier spacing information, the sub-band bandwidth, etc. and other related aspect can be similar to those in FIG. 3 and thus will be not elaborated herein.

Figure 8:
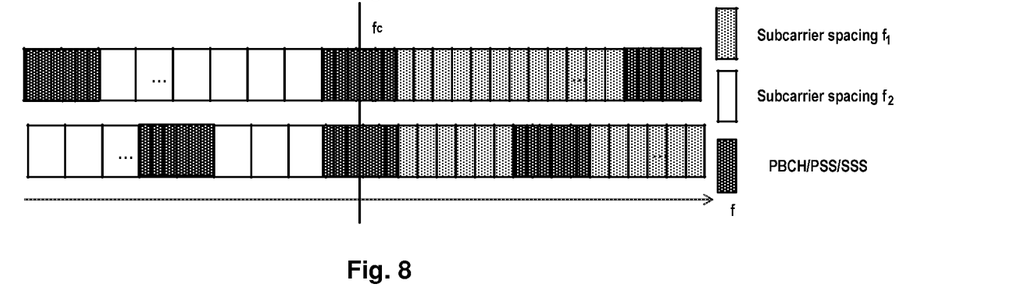
FIG. 8 schematically illustrates diagrams of example positions of common downlink transmission resource and additional downlink transmission resource for carrying information about numerologies according to a still yet embodiment of the present disclosure.

FIG. 8 schematically illustrates diagrams of example positions of common downlink transmission resource and additional downlink transmission resource for carrying information about numerologies according to a yet still embodiment of the present disclosure. In FIG. 8, all of the common PBCH/PSS/SSS and the additional PBCH/PSS/SSS have a fixed subcarrier spacing (e.g. 15 KHz) and there are illustrated an even number of numerologies to be multiplexed in the system bandwidth and the system band is evenly divided for the numerologies. That is to say, the numerologies will be equally multiplexed on the system bandwidth. In this case, the common PBCH/PSS/SSS is still located at the center of the system bandwidth and it is not located within any of the sub-band but across two sub-bands. Thus, the common PBCH can obtain the number of numerologies to be multiplexed. In addition, the common PBCH may further comprise position information of the additional PBCHs if they are transmitted not at the borders of the system bandwidth but at borders of sub-bands or at the sub-band center. However, this information can also be deduced by UE according to the system bandwidth and the number of multiplexed numerologies For example, for 20 MHz bandwidth and 4 equally multiplexed numerologies, the terminal device then can know that the PBCHs will be located at the center of each 5 MHz bandwidth. In this case, it is enough to include the number of multiplexed numerology in the PBCH and position information of the additional PBCH is unnecessary. In such a case, compared with the legacy PBCH, the additional sub-band specific PBCH can further include the subcarrier spacing, sub-band bandwidth or the start and end position of the sub-band of the corresponding numerology (if the related information is not provided in the common PBCH). The system bandwidth may not be necessary anymore, either.

Figure 9:
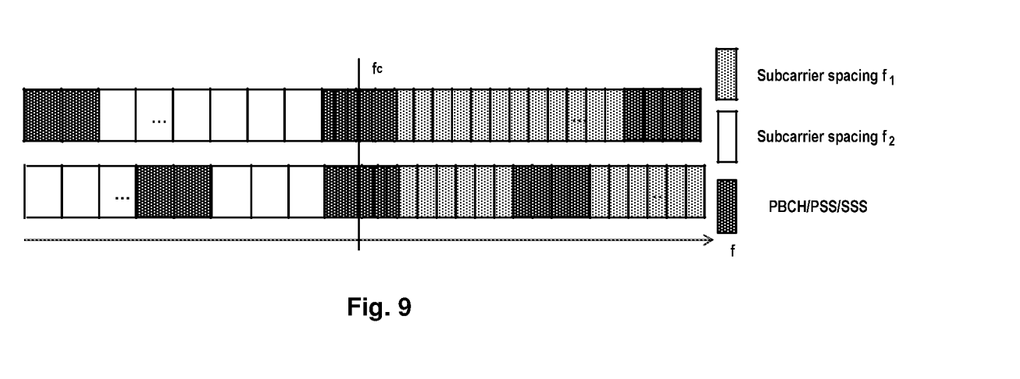
FIG. 9 schematically illustrates diagrams of example positions of common downlink transmission resource and additional downlink transmission resource for carrying information about numerologies according to a yet still embodiment of the present disclosure.

FIG. 9 schematically illustrates diagrams of example positions of common downlink transmission resource and additional downlink transmission resource for carrying information about numerologies according to another embodiment of the present disclosure. In this case, each of the additional PBCHs uses sub-band specific subcarrier spacing. In such a case, in addition to the information contained in the common PBCH in FIG. 8, subcarrier spacing information for respective numerologies shall be further included in the common PBCH. Compared with the legacy PBCH, the additional PBCH can include further the sub-band bandwidth or the start and end position of the sub-band of the corresponding numerology (if related information is not provided in the common PBCH). At the same time, the system bandwidth may not be necessary anymore.

Similarly, for the cases as illustrated in FIGS. 8 and 9, the information about the numerologies can be transmitted in the MIB using the spare 10 bits with or without additional information bits. Alternatively, all the numerology related information can also be transmitted with new information bits. In addition, it shall be appreciated that in FIGS. 8 and 9, the indication about information such as the subcarrier spacing information, the sub-band bandwidth, etc. and other related aspect can be similar to those in FIG. 3 and thus will be not elaborated herein.

Figure 10:
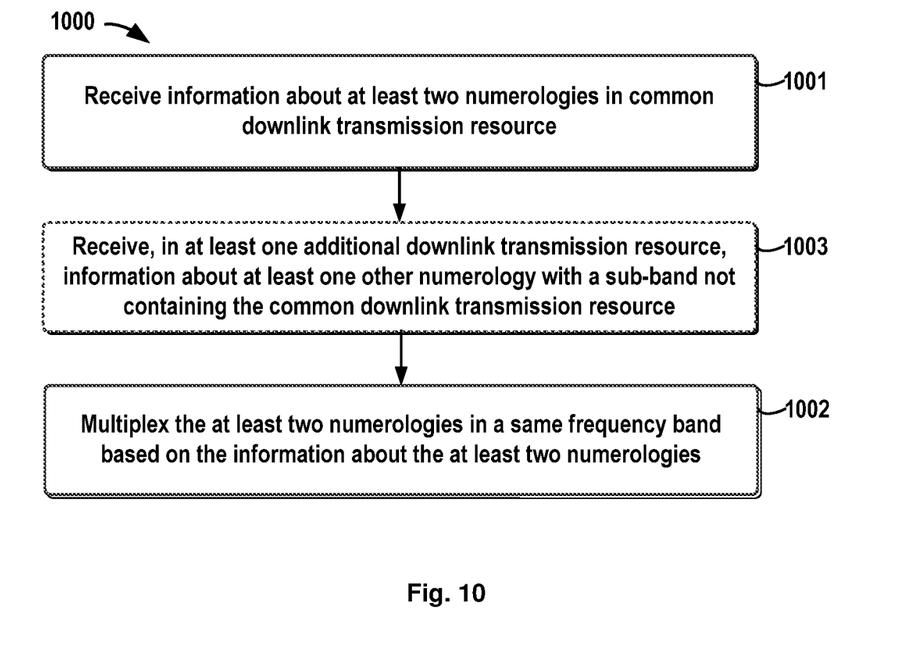
FIG. 10 schematically illustrates a flow chart of a method of numerology multiplexing at a terminal device in a wireless communication system according to an embodiment of the present disclosure.

In addition, FIG. 10 schematically illustrates a flow chart of a method of numerology multiplexing at a terminal device in a wireless communication system according to an embodiment of the present disclosure. The method 1000 can be implemented at a terminal device, for example UE, or other like terminal devices.

As illustrated in FIG. 10, the method 1000 starts from step 1001, in which information about at least two numerologies in common downlink transmission resource is received. In an embodiment of the present disclosure, the common downlink transmission resource is located at the center of the system bandwidth. In another embodiment of the present disclosure, the common downlink transmission resource has a fixed subcarrier spacing.

Then, in step 1002, the at least two numerologies are multiplexed in a same frequency band based on the information about the at least two numerologies. In an embodiment of the present disclosure, the at least two numerologies can be multiplexed with a smallest one of frequency spacings for the at least two numerologies on a central frequency of a system bandwidth. In another embodiment of the present disclosure, the at least two numerologies are multiplexed based on a predetermined pattern.

Additionally and optionally, the method may further comprise step 1003, in which information about at least one other numerology with a sub-band not containing the common downlink transmission resource is further received in at least one additional downlink transmission resource. In an embodiment of the present disclosure, the at least one additional downlink transmission resource has a fixed subcarrier spacing or has a sub-band specific subcarrier spacing. In another embodiment of the present disclosure, the at least one additional downlink transmission resource is located at a border of a system bandwidth or at a sub-band center.

In an embodiment of the present disclosure, the information about the at least two numerologies may comprise at least one of: the number of numerologies to be multiplexed; numerology multiplexing configuration information; subcarrier spacing for at least one of the numerologies; sub-band bandwidth information for at least one of the numerologies; and position information about additional downlink transmission resource for the at least one of the numerologies.

In another embodiment of the present disclosure, the at least one additional downlink transmission resource comprises at least one of: sub-band bandwidth for the at least one additional downlink transmission resource and subcarrier spacing for the at least one additional downlink transmission resource.

Hereinabove, the method of numerology multiplexing at a terminal device is briefly described with reference to FIG. 10 and many details about the operations and features in the method are similar to the method at the severing node. Thus, for details, reference can be made to corresponding description with reference to FIGS. 1 to 10.

Thus, with embodiments of the present disclosure, it is possible to enable different numerologies to be multiplexed in the same band and thus support the numerology multiplexing in new radio system like 5G.

Besides, in the present disclosure, there are also provided apparatuses for numerology multiplexing at the serving node and terminal device in a wireless communication system respectively, which will be described next with reference to FIGS. 11 and 12.

Figure 11:
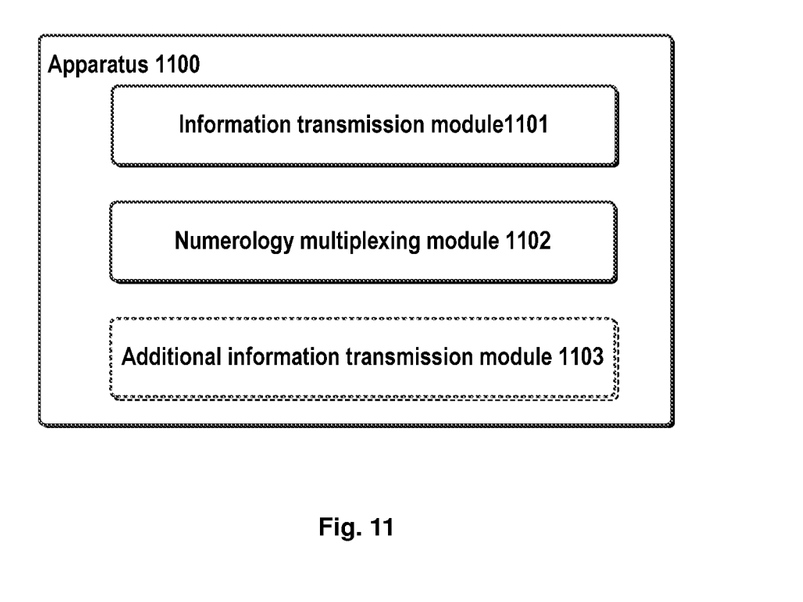
FIG. 11 schematically illustrates a block diagram of an apparatus for numerology multiplexing at a serving node in a wireless communication system according to an embodiment of the present disclosure.

FIG. 11 schematically illustrates a block diagram of an apparatus 1100 for numerology multiplexing at a serving node in a wireless communication system according to an embodiment of the present disclosure. The apparatus 1100 can be implemented at a serving node, for example a BS, like a node B (NodeB or NB). In the embodiment as illustrated in the FIG. 11, the apparatus 1100 may comprise an information transmission module 1101 and a numerology multiplexing module 1102. The numerology multiplexing module 1102 may be configured to multiplex the at least two numerologies in a same frequency band based on the information about the at least two numerologies.

In an embodiment of the present disclosure, the numerology multiplexing module 1102 may be further configured to multiplex the at least two numerologies with a smallest one of frequency spacings for the at least two numerologies on a central frequency of a system bandwidth. In another embodiment of the present disclosure, the numerology multiplexing module is further configured to multiplex the at least two numerologies based on a predetermined pattern.

In a further embodiment of the present disclosure, the common downlink transmission resource may be located at a center of a system bandwidth. Additionally or alternatively, the common downlink transmission resource may have a fixed subcarrier spacing.

In a still further embodiment of the present disclosure, the apparatus 1100 may further comprise an additional information transmission module 1103. The additional information transmission module 1103 may be configured to transmit, in at least one additional downlink transmission resource, information about at least one other numerology with a sub-band not containing the common downlink transmission resource.

In a yet further embodiment of the present disclosure, the at least one additional downlink transmission resource may have a fixed subcarrier spacing or has a sub-band specific subcarrier spacing.

In a still yet further embodiment of the present disclosure, the at least one additional downlink transmission resource may be located at a border of a system bandwidth or at a sub-band center.

In another embodiment of the present disclosure, the information about the at least two numerologies may comprise at least one of: the number of numerologies to be multiplexed; numerology multiplexing configuration information; subcarrier spacing information for at least one of the numerologies; sub-band bandwidth information for at least one of the numerologies; and position information about additional downlink transmission resource for at least one of the numerologies.

In a further embodiment of the present disclosure, the at least one additional downlink transmission resource may comprise at least one of: sub-band bandwidth information for the at least one additional downlink transmission resource and subcarrier spacing information for the at least one additional downlink transmission resource.

Figure 12:
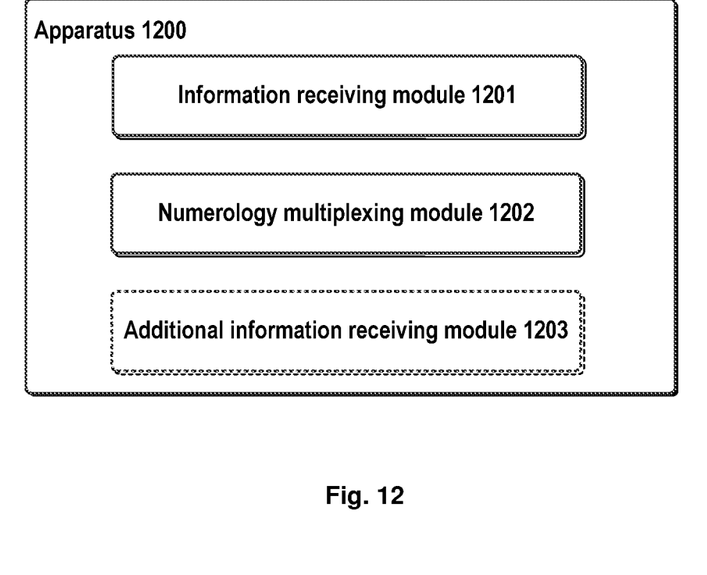
FIG. 12 schematically illustrates a block diagram of an apparatus for numerology multiplexing at a terminal device in a wireless communication system according to an embodiment of the present disclosure.

FIG. 12 further schematically illustrates a block diagram of an apparatus 1200 for numerology multiplexing at a terminal device in a wireless communication system according to an embodiment of the present disclosure. The apparatus 1200 can be implemented at a terminal device, for example UE, or other like terminal devices.

As illustrated in FIG. 12, the apparatus 1200 comprises an information receiving module 1201 and a numerology multiplexing module 1202. The information receiving module 1101 may be configured to receive information about at least two numerologies in common downlink transmission resource. The numerology multiplexing module 1202 may be configured to multiplex the at least two numerologies in a same frequency band based on the information about the at least two numerologies.

In an embodiment of the present disclosure, the numerology multiplexing module 1202 may be further configured to multiplex the at least two numerologies with a smallest one of frequency spacings for the at least two numerologies on a central frequency of a system bandwidth, In another embodiment of the present disclosure, the numerology multiplexing module 1202 may be further configured to multiplex the at least two numerologies based on a predetermined pattern.

In a further embodiment of the present disclosure, the common downlink transmission resource may be located at a center of a system bandwidth. In a further embodiment of the present disclosure, the common downlink transmission resource has a fixed subcarrier spacing.

In another embodiment of the present disclosure, the apparatus 1200 may further comprise an additional information receiving module 1203. The additional information receiving module 1203 may be configured to receive, in at least one additional downlink transmission resource, information about at least one other numerology with a sub-band not containing the common downlink transmission resource.

In a further embodiment of the present disclosure, the at least one additional downlink transmission resource may have a fixed subcarrier spacing or has a sub-band specific subcarrier spacing. In a still further embodiment of the present disclosure, the at least one additional downlink transmission resource may be located at a border of a system bandwidth or at a sub-band center.

In a yet further embodiment of the present disclosure, the information about the at least two numerologies may comprise at least one of the number of numerologies to be multiplexed; numerology multiplexing configuration information; subcarrier spacing information for at least one of the numerologies; sub-band bandwidth information for at least one of the numerologies; and position information about additional downlink transmission resource for at least one of the numerologies.

In still yet embodiment of the present disclosure, the at least one additional downlink transmission resource comprises at least one of: sub-band bandwidth information for the at least one additional downlink transmission resource and subcarrier spacing information for the at least one additional downlink transmission resource.

Hereinbefore, the apparatuses 1100 and 1200 are described with reference to FIGS. 11 and 12. It is noted that the apparatuses 1100 and 1200 may be configured to implement functionalities as described with reference to FIGS. 1 to 10. Therefore, for details about the operations of modules in these apparatuses, one may refer to those descriptions made with respect to the respective steps of the methods with reference to FIGS. 1 to 10.

It is further noted that the components of the apparatuses 1100 and 1200 may be embodied in hardware, software, firmware, and/or any combination thereof. For example, the components of apparatuses 1100 and 1200 may be respectively implemented by a circuit, a processor or any other appropriate selection device. Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In some embodiment of the present disclosure, apparatuses 1100 and 1200 may comprise at least one processor. The at least one processor suitable for use with embodiments of the present disclosure may include, by way of example, both general and special purpose processors already known or developed in the future. Apparatuses 1100 and 1200 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1100 and 1200 to at least perform operations according to the method as discussed with reference to FIGS. 1 to 10 respectively.

It shall be appreciated that although PBCH is mainly described as the downlink transmission resource for carrying numerology related information, the present disclosure, it not limited thereto, it is also possible to use another suitable downlink transmission resource, like PSS, SSS, etc. In addition, although in the description, the PBCH is described as including the example legacy information and the information about the numerologies, the present disclosure is not limited thereto. It is possible to include other information; for example, the PBCH can include the system information block (SIB) information as well.

Figure 13:
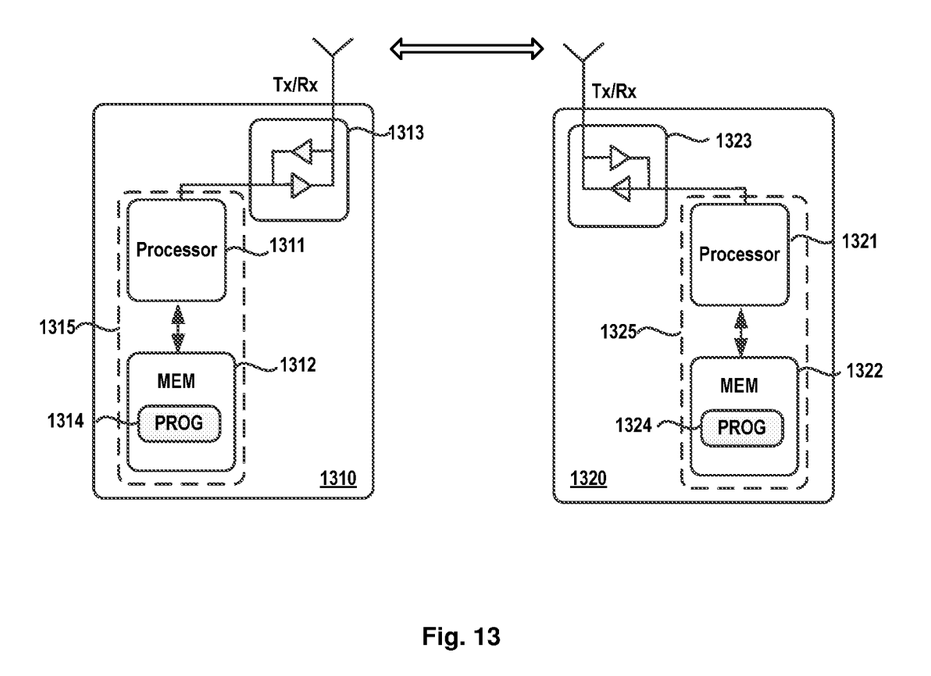
FIG. 13 further illustrates a simplified block diagram of an apparatus 1310 that may be embodied as or comprised in at a terminal device like UE and an apparatus 1320 that may be embodied as or comprised in a serving node like a base station in a wireless network as described herein.

FIG. 13 further illustrates a simplified block diagram of an apparatus 1310 that may be embodied as or comprised in a terminal device such as UE in a wireless network and an apparatus 1320 that may be embodied as or comprised in a base station such as NB or eNB as described herein.

The apparatus 1310 comprises at least one processor 1311, such as a data processor (DP) and at least one memory (MEM) 1312 coupled to the processor 1311. The apparatus 1310 may further comprise a transmitter TX and receiver RX 1313 coupled to the processor 1311, which may be operable to communicatively connect to the apparatus 1320. The MEM 1312 stores a program (PROG) 1314. The PROG 1314 may include instructions that, when executed on the associated processor 1311, enable the apparatus 1310 to operate in accordance with embodiments of the present disclosure, for example the method 100. A combination of the at least one processor 1311 and the at least one MEM 1312 may form processing means 1315 adapted to implement various embodiments of the present disclosure.

The apparatus 1320 comprises at least one processor 1321, such as a DP, and at least one MEM 1322 coupled to the processor 1321. The apparatus 1320 may further comprise a suitable TX/RX 1323 coupled to the processor 1321, which may be operable for wireless communication with the apparatus 1310. The MEM 1322 stores a PROG 1324. The PROG 1324 may include instructions that, when executed on the associated processor 1321, enable the apparatus 1320 to operate in accordance with the embodiments of the present disclosure, for example to perform the method 1000. A combination of the at least one processor 1321 and the at least one MEM 1322 may form processing means 1325 adapted to implement various embodiments of the present disclosure.

Various embodiments of the present disclosure may be implemented by computer program executable by one or more of the processors 1311, 1321, software, firmware, hardware or in a combination thereof.

The MEMs 1312 and 1322 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1311 and 1321 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of numerology multiplexing in a wireless communication system, the method comprising:
   transmitting information about at least two numerologies in common downlink transmission resource;
   multiplexing the at least two numerologies in a same frequency band without a guard period between the at least two numerologies based on the information about the at least two numerologies; and
   performing wireless communication based on the at least two numerologies multiplexed in the same frequency band,
   wherein downlink transmission resource information common to both the at least two numerologies is located at a center frequency of the frequency band.

2. The method of claim 1, wherein the at least two numerologies are multiplexed with a smallest one of frequency spacings for the at least two numerologies on a central frequency of a system bandwidth, or
   wherein the at least two numerologies are multiplexed based on a predetermined pattern.

3. The method of claim 1, wherein the common downlink transmission resource has a fixed subcarrier spacing.

4. The method of claim 1, further comprising:
   transmitting, in at least one additional downlink transmission resource, information about at least one other numerology with a sub-band not containing the common downlink transmission resource.

5. The method of claim 4, wherein the at least one additional downlink transmission resource has a fixed subcarrier spacing; or
   wherein the at least one additional downlink transmission resource has a sub-band specific subcarrier spacing.

6. The method of claim 4, wherein the at least one additional downlink transmission resource is located at a border of a system bandwidth; or
   wherein the at least one additional downlink transmission resource is located at a sub-band center.

7. The method of claim 1, wherein the information about the at least two numerologies comprises at least one of:
   the number of numerologies to be multiplexed;
   numerology multiplexing configuration information;
   subcarrier spacing information for at least one of the numerologies;
   sub-band bandwidth information for at least one of the numerologies; and
   position information about additional downlink transmission resource for at least one of the numerologies.

8. The method of claim 4, wherein the at least one additional downlink transmission resource comprises at least one of: sub-band bandwidth information for the at least one additional downlink transmission resource and subcarrier spacing information for the at least one additional downlink transmission resource.

9. The method of claim 1, wherein the least two numerologies are adjacent to each other in the same frequency.

10. A method of numerology multiplexing in a wireless communication system, the method comprising:
    receiving information about at least two numerologies in common downlink transmission resource;
    multiplexing the at least two numerologies in a same frequency band without a guard period between the at least two numerologies based on the information about the at least two numerologies; and
    performing wireless communication based on the at least two numerologies multiplexed in the same frequency band,
    wherein downlink transmission resource information common to both the at least two numerologies is located at a center frequency of the frequency band.

11. The method of claim 10, wherein the at least two numerologies are multiplexed with a smallest one of frequency spacings for the at least two numerologies on a central frequency of a system bandwidth, or
    wherein the at least two numerologies are multiplexed based on a predetermined pattern.

12. The method of claim 10,
    wherein the common downlink transmission resource has a fixed subcarrier spacing.

13. The method of claim 10, further comprising:
    receiving, in at least one additional downlink transmission resource, information about at least one other numerology with a sub-band not containing the common downlink transmission resource.

14. The method of claim 13, wherein the at least one additional downlink transmission resource has a fixed subcarrier spacing, or wherein the at least one additional downlink transmission resource has a sub-band specific subcarrier spacing; and/or
    wherein the at least one additional downlink transmission resource is located at a border of a system bandwidth, or wherein the at least one additional downlink transmission resource is located at a sub-band center.

15. The method of claim 13, wherein the at least one additional downlink transmission resource comprises at least one of: sub-band bandwidth information for the at least one additional downlink transmission resource and subcarrier spacing information for the at least one additional downlink transmission resource.

16. The method of claim 10, wherein the information about the at least two numerologies comprise at least one of:
the number of numerologies to be multiplexed;
numerology multiplexing configuration information;
subcarrier spacing information for at least one of the numerologies;
sub-band bandwidth information for at least one of the numerologies; and
position information about additional downlink transmission resource for at least one of the numerologies.

17. The method of claim 10, wherein the least two numerologies are adjacent to each other in the same frequency.

18. An apparatus for numerology multiplexing in a wireless communication system, the apparatus comprising:
a memory storing one or more instructions; and
at least one processor configured to execute the one or more instructions to:
transmit information about at least two numerologies in common downlink transmission resource;
multiplex the at least two numerologies in a same frequency band without a guard period between the at least two numerologies based on the information about the at least two numerologies; and
perform wireless communication based on the at least two numerologies multiplexed in the same frequency band,
wherein downlink transmission resource information common to both the at least two numerologies is located at a center frequency of the frequency band.

19. The apparatus of claim 18, wherein the processor is further configured to multiplex the at least two numerologies with a smallest one of frequency spacings for the at least two numerologies on a central frequency of a system bandwidth, or
wherein the processor is further configured to multiplex the at least two numerologies based on a predetermined pattern.

20. The apparatus of claim 18,
wherein the common downlink transmission resource has a fixed subcarrier spacing.

21. The apparatus of claim 18, wherein the processor is further configured to:
transmit, in at least one additional downlink transmission resource, information about at least one other numerology with a sub-band not containing the common downlink transmission resource.

22. The apparatus of claim 18, wherein the least two numerologies are adjacent to each other in the same frequency.

* * * * *